United States Patent [19]

Petiot

[11] 4,432,740
[45] Feb. 21, 1984

[54] UNIVERSAL JOINTS AND A HOLDING CLIP FOR SUCH JOINTS

[75] Inventor: Jean P. Petiot, Massy, France

[73] Assignee: Automobiles Citroen; Automobiles Peugeot, both of Paris, France

[21] Appl. No.: 298,101

[22] Filed: Aug. 31, 1981

[30] Foreign Application Priority Data

Sep. 24, 1980 [FR] France ................ 80 20523

[51] Int. Cl.$^3$ .............................................. F16D 3/22
[52] U.S. Cl. ................................. 464/146; 464/906
[58] Field of Search ............. 464/139, 141, 145, 146, 464/906

[56] References Cited

U.S. PATENT DOCUMENTS

| | | | |
|---|---|---|---|
| 3,362,192 | 1/1968 | Orain | 464/146 |
| 3,452,558 | 7/1969 | Cull et al. | 464/906 X |
| 4,000,629 | 1/1977 | Bellomo | 464/906 X |
| 4,008,582 | 2/1977 | Welschof | 464/146 |
| 4,012,924 | 3/1977 | Krude | 464/146 |

FOREIGN PATENT DOCUMENTS 1444895 5/1965 France.
2101414 5/1970 France.

*Primary Examiner*—Stuart S. Levy
*Assistant Examiner*—Daniel P. Stodola
*Attorney, Agent, or Firm*—Stevens, Davis, Miller & Mosher

[57] ABSTRACT

A universal joint is provided comprising an outer substantially bowl-shaped element having a cylindrical bore in which are formed tracks, an inner element housed in this bore and having a convex external surface provided with grooves, and connecting balls, disposed respectively in a track of the outer element and in a groove of the inner element. These connecting balls are held in position by a cage which has a concave internal surface adapted to cooperate with the convex external surface of the inner element, and a convex external surface. The clip is also provided with positioners removable positioning means for securing the cage with respect to the outer element.

The removable positioners are formed by an expandable holding clip comprising at least two diametrically opposite lugs adapted to surround the cage and having a concave shape so as to cooperate with the external surface of this cage. These lugs are engaged in grooves formed in the internal wall of the outer elements. The clip also includes a mechanism for immobilizing the clip on the external element.

7 Claims, 6 Drawing Figures

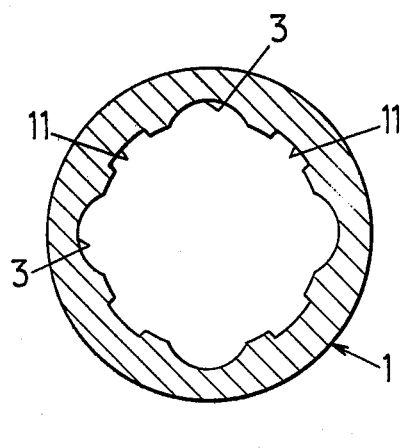
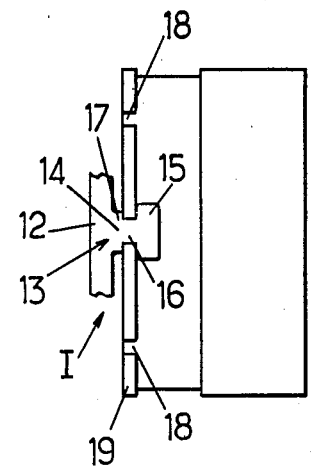
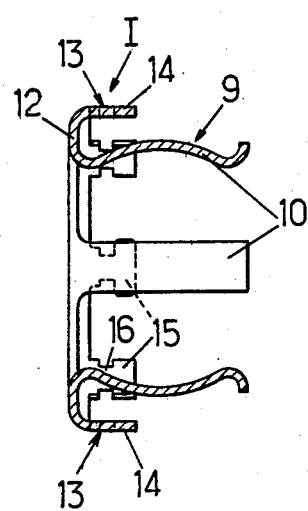
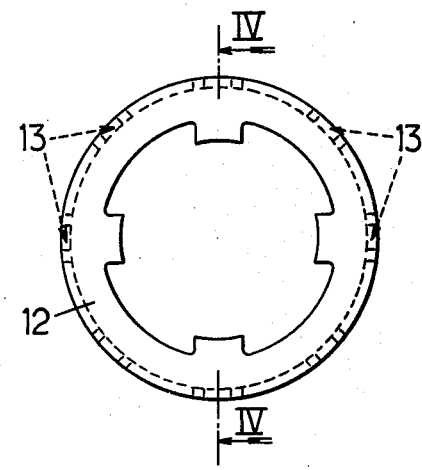

4,432,740

UNIVERSAL JOINTS AND A HOLDING CLIP FOR SUCH JOINTS

BACKGROUND OF THE INVENTION

The invention relates to universal joints of a kind comprising an outer element, substantially in the form of a bowl and, having a cylindrical bore in which tracks are formed, an inner element housed in this bore and presenting a convex external grooved surface and connecting members, particularly balls, disposed respectively in a track of the outer element and in a groove of the inner element. These connecting members are held in position by a cage which has a concave internal surface adapted to cooperate with a convex external surface of the inner element and a convex external surface. Removable positioning means are also provided to stop the cage with respect to the outer element.

Such universal joints are used especially for the homokinetic transmission of rotational movements in motor vehicles.

Depending on the situation, the transmission of the rotational movement may be accompanied by the inner element sliding with respect to the outer element (sliding universal joints), or may take place without any axial sliding movement of the inner element with respect to the outer element (fixed universal joints).

Removable means have already been proposed for positioning the cage so as to transform a sliding universal joint into a fixed universal joint and conversely.

However, the solutions proposed up to now are relatively complicated and involve difficulties in handling and mounting.

SUMMARY OF THE INVENTION

The aim of the invention is to provide a universal joint of the above-defined kind in which the means for positioning the cage with respect to the outer element are simple and inexpensive and allow easy mounting of the cage inside the outer element.

According to the invention, a universal joint of the above-defined kind is characterized by the fact that said removable means for positioning the cage are formed by an expandable holding clip comprising at least two diametrically opposite lugs, adapted to surround the cage and having a concave shape so as to cooperate with the external surface of this cage. These lugs are engaged in grooves formed in the internal wall of the outer element. The clip also includes a means for immobilizing the clip on the outer element.

The lugs of the clip extend longitudinally in a direction substantially parallel to the axis of the outer element and are integral with a ring whose mean plane is orthogonal to the mean direction of the lugs.

Preferably, the clip comprises four evenly angularly-spaced lugs, with the corresponding grooves being provided in the outer element.

The means for immobilizing the clip on the outer element are advantageously formed by curved-back resilient hooks having a widened end and a zone of smaller width. This zone is adapted to be introduced, by elastic deformation of the hook, into a notch provided in a collar of the outer element.

The invention also relates to a clip for holding a cage for a universal joint. This clip includes the above-mentioned characteristics.

The invention consists, apart from the arrangements outlined above, of certain other arrangements which will be more explicitly discussed hereafter in connection with the drawings.

The following discussion is not intended to limit the scope of the present invention.

BRIEF DESCRIPTION OF THE DRAWINGS

FIG. 3 is a section along III—III of FIG. 1 of the outer element.

FIG. 4 is a section along IV—IV of FIG. 5 of the clip.

FIG. 5 is a left-hand view, with respect to FIG. 4, of the clip.

FIG. 6, finally, is a partial elevational view of the outer element and means for hooking the clip onto this outer element.

DETAILED DESCRIPTION OF THE DRAWINGS

Figure 1:
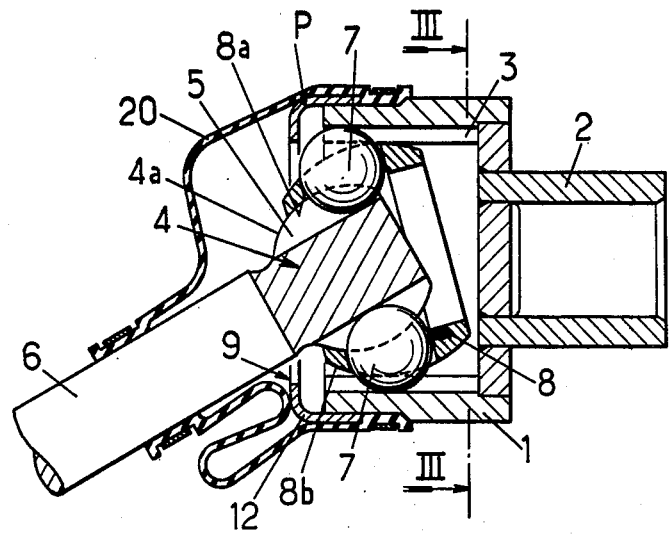
FIG. 1, of these drawings, is an axial section of a universal joint in accordance with the invention, through a diametrical plane passing through the centres of two opposite balls.
Figure 2:
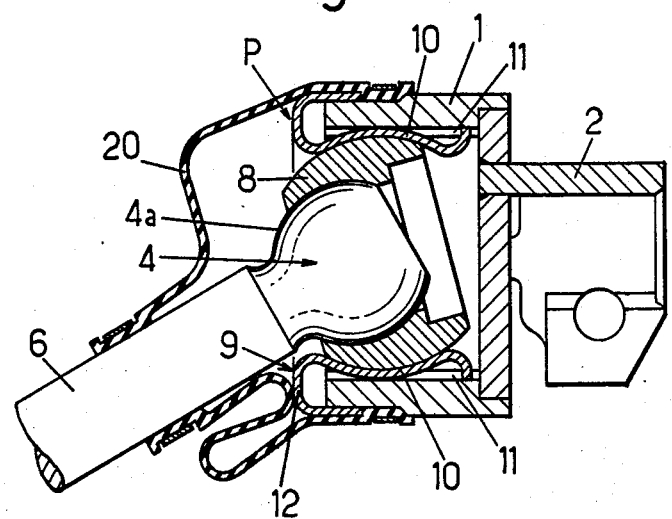
FIG. 2 is a diametrical section of the joint through a plane equidistant from two adjacent balls.

Referring to the drawings, particularly to FIGS. 1 and 2, a universal joint can be seen which comprises an outer element substantially in the form of a bowl 1, integral with a driving shaft 2. The bowl 1 comprises a cylindrical bore in the wall of which are formed four rectilinear tracks 3 orientated along the generatrices of the cylindrical bowl 1. The tracks, formed by channels, are spaced evenly apart angularly.

The joint also comprises an inner element 4, housed in the bore of bowl 1 and having an external convex surface 4a with rectilinear grooves 5. This inner element 4 is integral with a driven shaft 6. Element 4 may be formed by an extension of this shaft, having a spherical shape.

The universal joint further comprises connecting members formed by balls 7 disposed respectively in a track 3 of the outer element 1 and in a groove 5 of the inner element 4.

A cage 8 holds the balls 7 in position. This cage has a spherical concave internal surface 8a for cooperating with the spherical-shaped surface 4a of the inner element 4, and an outer surface 8b having a spherical convex shape.

Removable positioning means P are provided for securing cage 8 with respect to the outer element 1. When means P are mounted in the universal joint, this joint forms a fixed articulation and the inner element 4 swings about a fixed point with respect to the outer element 1.

When the positioning means P are removed, the inner element 4 may slide axially in the outer element 1 and the universal joint becomes a sliding universal joint.

The positioning means P are formed by an expandable holding clip 9, made from sheet metal. This clip 9 comprises for example four lugs 10 spaced evenly apart angularly. These lugs extend longitudinally in a mean direction parallel to the axis of the outer element 1 and are adapted to resiliently clamp cage 8. Each lug 10 has a concave shape in the longitudinal direction so as to cooperate with the external surface of cage 8. Lugs 10 are engaged, at least partially, in corresponding grooves 11 (FIG. 3) provided in the outer element 1. As can be seen from FIG. 3, grooves 11 are formed between two tracks 3.

The lugs 10 are integral with the inner edge of a ring 12 (FIG. 4) whose mean plane is orthogonal to the mean longitudinal direction of each lug.

Immobilizing means I are provided for securing clip 9 on the outer element 1. These immobilizing means I are formed by curved-back hooks 13 provided on the outer edge, in the radical direction, of ring 12. These hooks 13 comprise an outer part 14 extending in a longitudinal direction substantially parallel to that of lugs 10. The curved-back hooks 13 have a certain resilience and have a widened end 15 (FIG. 6) ending in the part 14, and a zone of smaller width 16 situated between end 15 and another widened part 17 forming a flange of ring 12. These parts or zones 15, 16 and 17 are situated substantially in a plane orthogonal to the plane of ring 12. The zone of smaller width 16 is obtained by forming notches on the two lateral edges of part 14.

This zone of lesser width 16 of hook 13 is intended to be introduced in a notch 18 provided on a collar 19, of bowl 1, formed at the end of this bowl which opens outwardly.

The widened part 15 passes over collar 19 because of the elastic deformation of hook 13, while moving apart part 14, in the radial direction, of lugs 10. When zone 16 arrives at right angles to notch 18, the outer part 14 is released and assumes its normal position, which causes zone 16 to enter notch 18 and clip 9 to be locked on bowl 1.

The number of resilient hooks 13 may be equal to eight as shown in the drawings; the angular positions of these hooks correspond to those of the four tracks 3 and of the four grooves 11.

A flexible sealing sleeve 20 protects the universal joint and is mounted, at one of its ends, on bowl 1 while surrounding clip 9 and, at its other end, on shaft 6.

The assembly is mounted in the following way.

In a first step, clip 9 is mounted on cage 8 carrying balls 7 engaged in grooves 5 of the inner element 4, by elastic deformation of lugs 10.

In a second step, this assembly is introduced inside bowl 1. The balls 7 engage in tracks 3, while lugs 10 engage in grooves 11.

The whole is interlocked, in translation, with bowl 1 by engaging the zones of smaller width 16 in notches 18 of collar 19 by elastic deformation of hooks 13. The sealing sleeve 20 is then fitted.

The assembly of the universal joint forming a fixed articulation is then finished.

The shaft may freely swing about a fixed point with respect to bowl 1, which cage 8 swings freely in the receptacle formed by lugs 10. The rotational torque between the driving shaft 2 and the driven shaft 6 is transmitted by the balls 7.

In the case where it is desired to use bowl 1 to form a sliding universal joint, it is sufficient not to use clip 9 so as to leave inner element 4 with a possibility of sliding.

The same outer element 1 may thus be used either for a fixed joint, or for a sliding joint.

What is claimed is:

1. A universal joint comprising an outer element substantially in the form of a bowl and having a cylindrical bore in which tracks are formed, an inner element housed in this bore and having a convex external surface provided with grooves, connecting means disposed respectively in the tracks of the outer element and in the grooves of the inner element, a cage to hold said connecting means in position, said cage having a concave internal surface adapted to cooperate with the convex external surface of the inner element and a convex external surface, and removable positioning means for securing the cage with respect to the outer element, wherein an expandable holding clip is used to form said removable positioning means, said expandable holding clip comprising at least two diametrically opposite lugs adapted to surround the cage and having a concave shape so as to cooperate with the external surface of the cage, said lugs being engaged in grooves formed in an inner wall of the outer element, said clip further comprising means for immobilizing the clip which is engageable with the outer element, wherein the means for immobilizing the clip on the outer element is formed by resilient curved-back hooks, each having a widened end and a portion of smaller width, said portion of smaller width being adapted to be introduced, by elastic deformation of the hook, into a notch provided in a collar on the outer element.

2. The universal joint as claimed in claim 1, wherein the lugs of the clip extend longitudinally in a mean direction substantially parallel to the axis of the outer element, and are integral with a ring whose mean is orthogonal to the mean direction of the lugs.

3. The universal joint as claimed in claim 1, wherein the clip comprises four lugs, which are evenly and angularly spaced apart, and wherein the outer element is provided with grooves corresponding to said lugs.

4. The universal joint as claimed in claim 1, wherein said connecting means are a plurality of balls.

5. The universal joint as claimed in claim 1, wherein the clip comprises eight hooks.

6. A holding clip for a cage in a universal joint, as claimed in claim 1, wherein the clip comprises at least two diametrically opposite concave-shaped lugs, said lugs, which extend longitudinally in a mean direction substantially parallel to the axis of the outer element, being integral with a ring whose mean plane is orthogonal to the mean direction of the lugs, being adapted to cooperate with the external surface of the cage, and being engageable with grooves formed in an internal wall of the outer element, said clip further comprising means for immobilizing the clip which is engageable with the outer element.

7. An expandable holding clip for securing a cage in a universal joint comprising an outer element substantially in the form of a bowl and having a cylindrical bore in which tracks are formed, an inner element housed in this bore, and having a convex external surface provided with grooves, connecting means disposed respectively in the tracks of the outer element and in the grooves of the inner element, and a cage to hold said connecting means in position, said cage having a concave internal surface adapted to cooperate with the convex external surface of the inner element and a convex external surface, said expandable holding clip comprising at least two diametrically opposite concave-shaped lugs having a concave shape so as to cooperate with the external surface of the cage, said lugs, which extend longitudinally in a mean direction substantially parallel to the axis of the outer element, being engaged in grooves formed in an inner wall of the outer element and being integral with a ring whose mean plane is orthogonal to the mean direction of the lugs, said clip further comprising means for immobilizing the clip which is engageable with the outer element, said means for immobilizing being formed by resilient curved-back hooks, each having a widened end and a portion of smaller width, said portion of smaller width being adapted to be introduced, by elastic deformation of the hook, into a notch provided in a collar of the outer element.

* * * * *